United States Patent [19]

Pollok

[11] Patent Number: 4,494,882
[45] Date of Patent: Jan. 22, 1985

[54] SELF-PUMPING THRUST BEARING FOR ELECTRIC MACHINES

[75] Inventor: Hans-Jurgen Pollok, Berlin, Fed. Rep. of Germany

[73] Assignee: Siemens Aktiengesellschaft, Munich, Fed. Rep. of Germany

[21] Appl. No.: 429,865

[22] Filed: Sep. 30, 1982

[30] Foreign Application Priority Data

Oct. 13, 1981 [DE] Fed. Rep. of Germany ....... 3141061

[51] Int. Cl.³ .................. F16C 17/06; F16C 17/00; F16C 33/10
[52] U.S. Cl. .................. 384/307; 384/303; 384/311; 384/415
[58] Field of Search .............. 384/130, 122, 121, 144, 384/194, 224, 240, 248, 251, 303–313, 368, 369, 397, 398, 399, 415, 132, 420, 424–426; 184/5, 6.18, 6.23

[56] References Cited

U.S. PATENT DOCUMENTS 3,977,738  8/1976  Sundstrand ................ 384/415

FOREIGN PATENT DOCUMENTS 131884   2/1947  Australia .................... 384/307
201372  12/1958  Austria ...................... 384/303
121957   6/1948  Sweden ...................... 384/303
780094   7/1957  United Kingdom ........ 384/306

*Primary Examiner*—John M. Jillions
*Assistant Examiner*—Thomas R. Hannon
*Attorney, Agent, or Firm*—Kenyon & Kenyon

[57] ABSTRACT

A self-pumping thrust bearing for electric machines having a vertical shaft is disclosed in which the oil is circulated via radially-extending bores which suck hot oil from an oil space adjacent to the vertical shaft and conduct it to at least one cooler through a stationary ring canal. In order to prevent air bubbles or foamed oil from being circulated with the oil, the oil suction space is enlarged by a recess extending to the radial bores on the inside of the thrust ring and additional radial bores are provided which open toward the oil suction space below the top end of a cylinder wall rotating with the thrust bearing which begins at the thrust ring. The oil contained in the oil suction space rotates together with the thrust ring, and a segregation of air bubbles or oil foam from the oil is obtained during the dwell time of the oil in the oil suction space.

3 Claims, 1 Drawing Figure

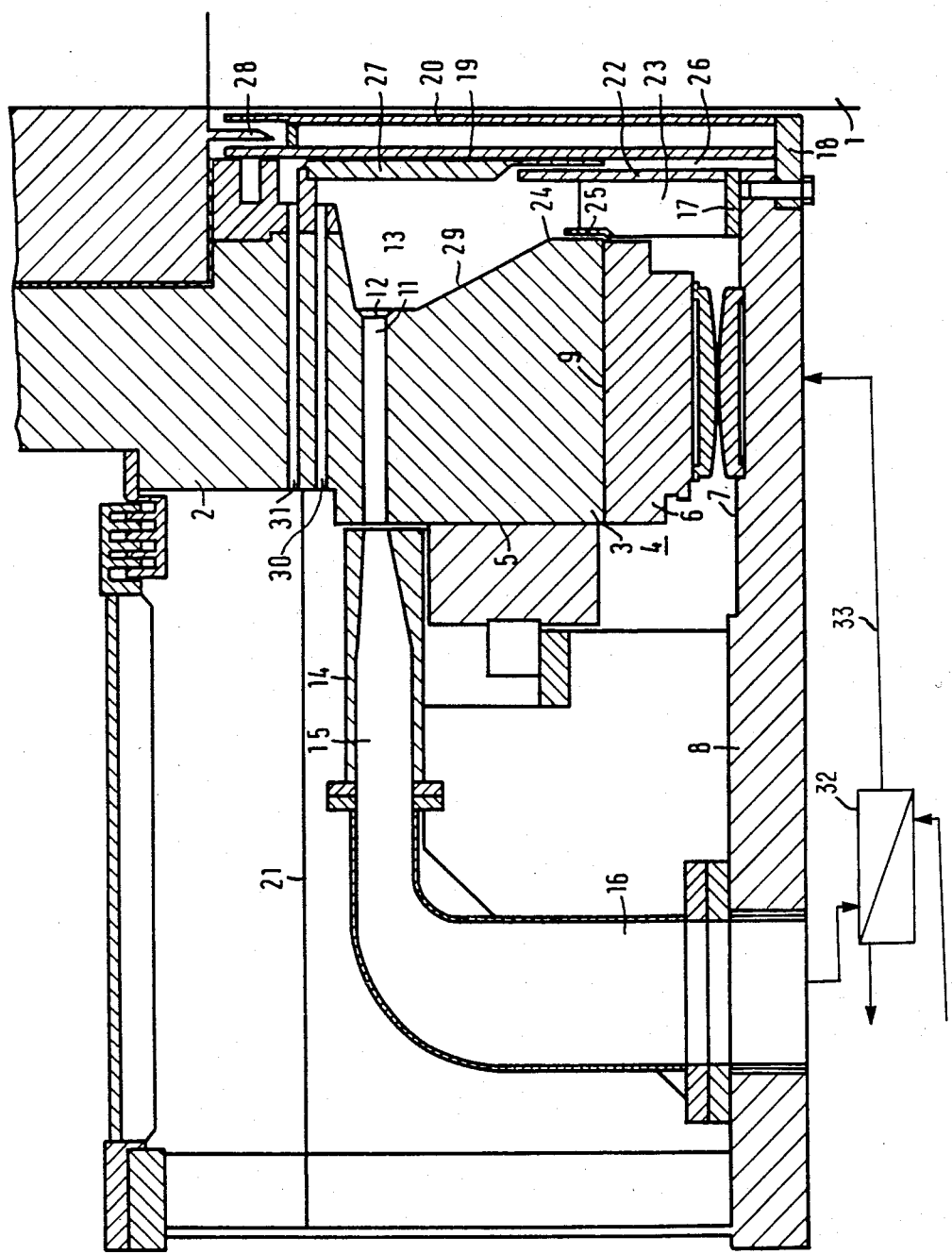

SELF-PUMPING THRUST BEARING FOR ELECTRIC MACHINES

BACKGROUND OF THE INVENTION

The present invention relates to a self-pumping thrust bearing for electric machines having a vertical shaft, particularly hydroelectric generators.

A self-pumping thrust bearing is disclosed in German Patent No. 901,360 in which overlapping stationary and rotating cylinder walls are arranged facing each other on the radially inner side of the thrust bearing cup and seal the latter against the shaft, and are intended to prevent air from penetrating the oil and thus prevent the oil from foaming.

Air bubbles entering the oil being circulated in a thrust bearing of the type described in German Patent No. 901,360 can lead to a large drop in oil pressure, which pressure is required to circulate the oil, and therefore to an impairment of the cooling of the bearing. In addition, a film of foamed oil has a reduced load-carrying capacity. Even when several cylinder walls are arranged overlapping with a rotating wall, it is still possible that air bubbles can enter into the oil space of the thrust bearing cup.

OBJECTS AND SUMMARY OF THE INVENTION

It is an object of the present invention to facilitate in a self-pumping thrust bearing of the above-described type the separation of air from the oil contained in the thrust bearing cup. It is another object to prevent air passing through the inner shaft seal from entering into the thrust bearing cup.

These and other objects are achieved by the thrust bearing disclosed herein.

In a thrust bearing according to the invention, oil circulation is brought about at least in part by approximately radially-extending bores or drill holes provided in a rotating thrust ring which suck oil from a radially inner oil suction space disposed above the bearing gap adjacent the thrust ring, and feed the oil via a ring canal arranged in an oposite stationary part to a cooler or coolers, from which the oil is fed to an oil space in the thrust bearing cup. The thrust bearing cup has at least one stationary cylinder wall which is disposed adjacent to the shaft, in front of which a rotating cylinder wall beginning at the thrust ring is arranged. The oil suction (or intake) space is enlarged by a recess on the inside of the rotating thrust ring, extending to the radial bores disposed therein. Additional radially-extending bores are provided in the thrust ring which open into the suction space below the top end of the rotating cylinder wall. The oil suction space, surrounded only by rotating surfaces, is defined by the walls of the recess on the radially inner side of the thrust ring and by the rotating cylinder wall which cooperate to form an oil space of large volume. The rotating cylinder wall acts like a centrifuge and, depending on the speed of rotation and the dwell time of the oil in the space, a separation of air bubbles and/or air-laden, foamed oil from the oil is obtained, where the air bubbles and air-laden, foamed oil rise or collect radially inwardly in front of the rotating cylinder wall and are not drawn into the oil being circulated by the pumping radial bores. Rather, the air and foamed oil enter into the additional radial bores located below the top end of the rotating cylinder wall, and are therefore not drawn in the oil circulation. The air and foamed oil are fed via the additional bores to a quiescent, radially outer part of the thrust bearing cup which is surrounded by standing walls, where the entrained air leaves the oil in the course of time via the oil level, and the oil is defoamed. A rotating oil intake space of large volume has the additional advantage that a pressure head builds up ahead of the openings of the pumping radial bores, so that the possibility of a break in the flow and therefore an interruption of the oil circulation in the bores is reduced.

It is preferred that the inner openings of the pumping radial holes are located at the radially outermost point of the recess in the thrust ring.

The above and other objects, features, aspects and advantages of the invention will be more apparent from the following description of the preferred embodiments thereof when considered with the accompanying drawing and appended claims.

BRIEF DESCRIPTION OF THE DRAWING

The present invention is illustrated by way of example and not limitation in the sole FIGURE of the accompanying drawing which is a radial cross-section view of a self-pumping thrust bearing in accordance with the invention.

DESCRIPTION OF THE PREFERRED EMBODIMENTS

Referring to the drawing, the vertical shaft 1 of a hydroelectric generator is supported via a support head 2 having a thrust ring 3 by a self-pumping thrust bearing comprising a support bearing 4 and a guide bearing 5. The support bearing 4 comprises individual thrust segments 6 which are adjustably supported on the bottom 7 of a thrust bearing cup 8 in a known manner.

To make continuous oil circulation possible, so that the oil which passes through the bearing gap 9 and is heated up in the process can be fed to coolers, not shown, radially-extending bores or holes 11 are provided in the thrust ring 3. The bores 11 bring about a pumping effect, similar to that of a centrifugal pump, when the thrust ring 3 rotates, and draw oil into the bores 11 from the oil suction space 13 located in front of the inner openings 12 of the radial bores 11. The rotating thrust ring 3 transports the oil drawn into bores 11 to a ring canal 15 which is arranged in a stationary part 14, from which the oil is fed via a line 16 to a cooler or coolers, represented schematically in the drawing by 32, and subsequently returned to the oil space of the thrust bearing cup 8 in conventional manner via line 33.

In order to seal the stationary thrust bearing cup 8 against the rotating vertical shaft 1, two support rings 17, 18 are fastened radially inwardly at the bottom 7 respectively supporting two mutually parallel cylinder walls. The support ring 18 is adjacent to the shaft 1 and includes two cylinder walls 19, 20, the cylinder wall 20 forming the inner boundary of the thrust bearing cup 8 located immediately in front of the cylinder surface of the shaft 1. Both cylinder walls 19, 20 extend to above the oil level 21 of the oil contained in the thrust bearing cup 8. The support ring 17 has a cylinder wall 22 which extends above the bearing gap 9 as well as a cylinder wall 25 held by ribs 23 which is provided to quiesce the oil and is located in the region immediately in front of the radial inside surface 24 of the thrust ring 3, covering the bearing gap 9. Into the gap 26 between the stationary cylinder walls 22 and 19 extends a rotating cylinder wall 27 which starts at the thrust ring and extends to the support head 2 below the oil level 21. To improve the shaft seal, a second rotating cylinder wall 28 is provided which extends into the gap between the two stationary cylinder walls 19 and 20 but is above the oil level 21. These nested cylinder walls rotate and form narrow gaps between them to prevent the entrance of air into the oil contained in the thrust bearing cup 8 and thus prevent foaming of the oil.

The oil suction space 13 has a large volume due to the large recess 29 which extends to the openings 12 of the radial bores 11 in the thrust ring 3. Since the oil suction space 13 is bounded only by rotating surfaces, namely, by the walls of the recess 29 in the thrust ring 3 and by the roating cylinder wall 27, the oil contained in this oil suction space co-rotates. Thereby, the oil suction space 13 acts like a centrifuge, so that any air bubbles or foam contained in the oil are segregated from the oil, depending on the speed of rotation and the dwell time of the oil in the oil intake space 13. The airfree oil passes via the radial bores 11 whose openings 12 are disposed at the radially outermost point of the recess 29, into the ring canal 15 and thereby becomes a part of the circulating oil. Air bubbles or oil containing air, on the other hand, accumulate radially inwardly and at the highest point of the oil suction space 13, i.e., immediately below the top of the rotating cylinder wall 27 at the thrust ring 3. There, additional radially-extending bores or holes 30 are provided which transport the foamed oil and/or air bubbles to the outer side of the thrust ring 3 and thus permit the oil to reach the quiescent part of the oil space in the thrust bearing cup 8, where the air bubbles rise to the oil level 21 and emerge, and where further defoaming of the oil takes place. Still farther above the oil level are further radially-extending bores or holes 31 which connect air spaces located inside and outside of the thrust ring 3 above the oil level 21.

If, in spite of the nested rotating and stationary cylinder walls, air should get into the interior of the thrust bearing cup 8 between the stationary cylinder wall 19 and the rotating cylinder wall 27 due to turbulence or lowering of the oil level, then this air will enter the rotating oil suction space 13, due to the stationary cylinder wall 22, but only far above the bearing gap 9, so that there is no danger that this air could get into the bearing gap 9.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of disclosure without department from the spirit and scope of the invention.

What is claimed is:

1. A self-pumping thrust bearing for electric machines having a vertical shaft comprising a rotating thrust ring, a thrust ring cup in which the thrust ring is disposed, an oil space between the thrust ring and the vertical shaft disposed above a bearing gap, a first set of approximately radially-extending bores in the rotating thrust ring in communication with the oil space, a ring canal arranged in a stationary part adjacent to the thrust ring into which the first set of radial bores open, the first set of radial bores being operative upon rotation of the thrust ring to suck oil from the oil space and feed it to the ring canal from which the oil is fed to at least one cooler and then returned to the thrust bearing cup, the thrust bearing cup including at least one stationary cylinder wall which is adjacent to the vertical shaft, a rotating cylinder wall disposed adjacent the stationary cylinder wall on the side thereof facing the oil space, the rotating cylinder wall beginning at the thrust ring and extending to the oil space, the oil space being enlarged by a recess extending at least to the first set of radial bores on the inside of the thrust ring, the first set of radial bores opening into the oil space adjacent the top of the recess, and a second set of approximately radially-extending bores provided in the thrust ring above the first set of radial bores, the second set of radial bores being in communication with the thrust bearing cup opening into the oil space in or above the recess enlarging the oil space and below a top end of the rotating cylinder wall for removing foamed oil and air from the oil space.

2. The self-pumping thrust bearing according to claim 1 wherein the top end of the rotating cylinder wall and the second set of radial bores are arranged below the oil level.

3. The self-pumping thrust bearing according to claim 1 wherein the inner openings of the first set of radial bores are located at a radially outermost point of the recess.

* * * * *